Oct. 27, 1970    D. FRIEDRICH    3,536,926
ELECTRO-OPTICAL METHOD AND APPARATUS FOR MEASURING THE
LATERAL DIMENSION OF RELATIVELY NARROW ELEMENTS
MOVING LONGITUDINALLY OF THEMSELVES
Filed April 17, 1967    3 Sheets-Sheet 1

INVENTOR
DIETER FRIEDRICH
BY
ATTORNEYS

Oct. 27, 1970        D. FRIEDRICH        3,536,926
ELECTRO-OPTICAL METHOD AND APPARATUS FOR MEASURING THE
LATERAL DIMENSION OF RELATIVELY NARROW ELEMENTS
MOVING LONGITUDINALLY OF THEMSELVES
Filed April 17, 1967        3 Sheets-Sheet 2

INVENTOR
DIETER FRIEDRICH
BY
ATTORNEYS

INVENTOR
DIETER FRIEDRICH
ATTORNEYS

United States Patent Office

3,536,926
Patented Oct. 27, 1970

3,536,926
ELECTRO-OPTICAL METHOD AND APPARATUS FOR MEASURING THE LATERAL DIMENSION OF RELATIVELY NARROW ELEMENTS MOVING LONGITUDINALLY OF THEMSELVES
Dieter Friedrich, Hilden, Germany, assignor to Exatest-Messtechnik, Leverkusen, Germany
Filed Apr. 17, 1967, Ser. No. 631,506
Claims priority, application Germany, Apr. 22, 1966, 1,548,207
Int. Cl. G01n 21/30; H01j 3/14, 39/12
U.S. Cl. 250—219
6 Claims

ABSTRACT OF THE DISCLOSURE

The lateral dimensions of relatively narrow elements moving longitudinally of themselves are measured by influencing a light beam incident upon an electro-optical device to provide electrical pulses having widths proportional to the lateral dimensions. The light beam is directed through one or more optical systems each including at least two light transmitting elements spaced coaxially along an optical axis and each including the electro-optical device. At least one fixed light transmitting aperture is centered on the longitudinal center line of the path of movement of the elements. Each optical system is revolved about an axis perpendicular to the center line so as to be cyclically aligned with a fixed aperture. Preferably two fixed apertures are provided in spaced relation along the longitudinal center line of the path of movement.

BACKGROUND OF THE INVENTION

There are known methods and apparatus for measuring the diameters of wires or the widths of narrow bands by means of light rays. In these known methods and devices, the workpiece, which is moving longitudinally continuously, influences a light beam incident on an electro-optical device to provide electrical pulses having pulse widths proportional to the respective diameters or widths of the workpiece.

The entire width of diameter of the workpiece is reproduced optically by means of a lens, and the reproduction is scanned by an electrical detector. This has the disadvantage that the respective measuring values vary unduly with varying distances between the workpiece and the lens.

SUMMARY OF THE INVENTION

The invention relates to a method and apparatus for measuring the diameter of wires or the width of narrow bands where the wires or bands are moving in a longitudinal direction and, more particularly, to an improved method and apparatus for measuring the diameter of wires or the widths of narrow bands, moving continuously in a longitudinal direction, by means of light rays or a light beam which is incident upon an electro-optical device and is influenced by the wire of band to produce electrical pulses proportional to the respective diameter or width.

In accordance with the present invention, disadvantages of prior art systems, as mentioned above, are obviated by directing the light beam through an optical system including at least two light transmitting elements centered on the light beam path from the work element, whose width is to be measured, to the electro-optical device, these light transmitting apertures being spaced longitudinally along the light beam path and the light transmitting aperture of at least one element having a width which is small relative to the dimension to be measured.

As applied to cold workpieces, or those which do not emit light, the workpieces are used to influence a light beam in such a way that they interrupt the light beam from a light source and throw a shadow. As applied, however, to glowing workpieces, the inherent light radiation is incident upon the electro-optical device to provide electrical pulses whose widths are proportional to the respective widths or diameters of the workpiece. While the light transmitting apertures are normally parallel or coaxial with each other, they can also be arranged in intersecting planes, for example, with the use of mirrors.

The apparatus of the invention is so arranged that the optical system, which may comprise a diaphragm system or a diaphragm and lens system, has an optical axis perpendicular to the longitudinal axis of the workpiece, and is moved or revolved around an axis parallel to the optical axis and perpendicular to the axis of the workpiece, the movement preferably following a circular path.

To this end, the apparatus includes a bell rotating about its axis and carrying one or more optical systems adjacent its periphery, these systems preferably being distributed at uniform angular distances around the circumference of the bell. A stationary base plate is arranged beneath the bell, and has one or more apertures for passage of the light beam, these apertures being arranged on the same circle as travelled by the optical systems, and preferably are likewise uniformly angularly spaced around the circumference of this circle. Instead of revolving the optical systems along a circular path, or another type of closed curve path, it is also possible to move the optical systems in any other manner periodically transversely of the workpiece.

The invention arrangement has the advantage that errors due to vertical displacement of the workpiece, or toward and away from the measuring device, are largely avoided. Consequently, measuring errors can be caused only by lateral displacement of the workpiece. In accordance with the invention, the errors due to lateral displacement of the workpiece can also be avoided by the use of an electronic trigger circuit associated with a correction circuit.

Accordingly, an object of the invention is to provide an improved method of measuring the lateral dimensions of relatively narrow elements moving longitudinally of themselves by influencing a light beam incident upon an electro-optical device to provide electrical pulses having pulse widths proportional to respective lateral dimensions along the elements.

Another object of the invention is to provide an apparatus for carrying out the aforementioned method.

A further object of the invention is to provide such a method in which a light beam is directed through an optical system including at least two light transmitting apertures centered on the light beam path from the element to the electro-optical device and spaced longitudinally along the light beam path.

Still another object of the invention is to provide a measuring apparatus of the type mentioned including an optical system having at least two light transmitting apertures centered on the light beam path from the element to the electro-optical device and spaced longitudinally along the light beam path.

A further object of the invention is to provide such a method and apparatus in which the apertures have widths which are small relative to the dimension to be measured.

Yet another object of the invention is to provide such a method and apparatus in which the optical system is moved laterally of the element to be measured with the light beam path between the apertures extending perpendicular to the longitudinal axis of the workpiece element.

A further object of the invention is to provide an apparatus for measuring the lateral dimensions of relatively narrow elements moving longitudinally of themselves by influencing a light beam, and including a bell rotatable about its axis and carrying at least one optical system adjacent its periphery, the optical systems, in the case of plural optical systems, being disposed at uniform angular intervals around the periphery.

Another object of the invention is to provide such an apparatus including a stationary base plate arranged beneath the bell and having one or more apertures for passage of the light beam, these apertures being arranged on the same circle as the optical systems and preferably at uniform angular intervals around the circumference of this circle.

A further object of the invention is to provide such an apparatus including novel trigger and correction means compensating for measuring errors caused by lateral displacement of the workpiece.

BRIEF DESCRIPTION OF THE DRAWINGS

For an understanding of the principles of the present invention, reference is made to the following description of typical embodiments thereof as illustrated in the accompanying drawings.

In the drawings:

FIG. 2b is a graphical illustration of output pulses provided by the apparatus shown in FIG. 2a;

FIG. 2c is a graphical illustration of two pulses illustrating variation in the widths of the pulses upon vibration of a work element as illustrated by the double-headed arrow of FIG. 2a;

FIG. 3b is a graphical illustration of the several pulses produced by the arrangement shown in FIG. 3a.

DESCRIPTION OF THE PREFERRED EMBODIMENTS

Figure 1:
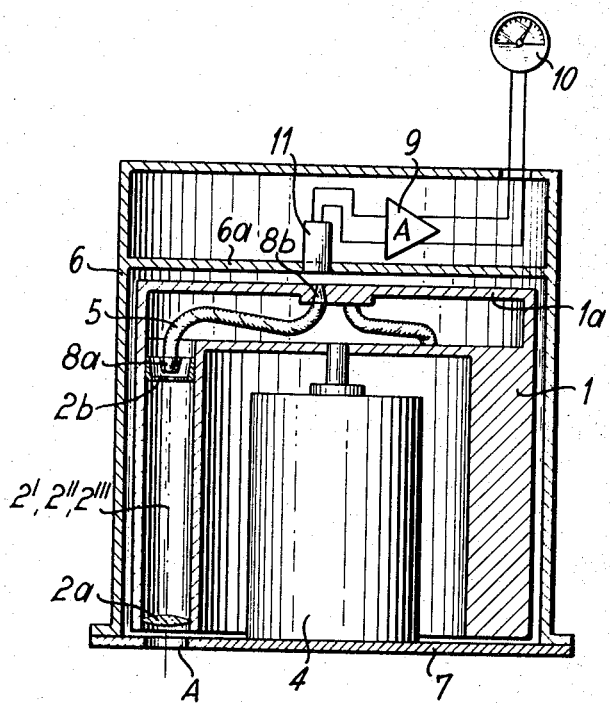
FIG. 1 is an axial sectional view, partly schematic, through apparatus embodying the invention.

Referring first to FIG. 1, three optical systems 2′, 2″ and 2‴ are arranged at equal angular intervals in the shell or circumferential wall of a suitable mounting means which is preferably a bell 1. Each optical system is a diaphragm-lens system including a lens 2a and a diaphragm 2b having an aperture. Lens 2a and the aperture of diaphragm 2b are coaxial with each other and with the optical axis of the associated optical system, and the diaphragm aperture has a width which is small relative to the dimension to be measured.

As illustrated, the aperture in diaphragm 2b receives a coupling 8a at one end of a light conducting element 5. Bell 1 is rotated about its axis by a motor 4 having an output shaft mounting bell 1 for such rotation, and motor 4 is mounted on a base plate 5 formed with an aperture A for the light beam emitted from element 3 or interrupted by element 3. Element 3 may be a wire or may be a relatively narrow band, and moves longitudinally and continuously in the direction of the arrow therebeneath.

The other end of light tube or photoconductor 5 has a coupling 8b which extends through an aperture in the end or head plate 1a of bell 1, the coupling 8b and the aperture in which it is secured having a relatively small radial spacing from the axis of motor 4 and bell 1. It will be appreciated that each of the optical systems 2′, 2″ and 2‴ has a respective photoconductor or light tube 5, and that the couplings 8b of the respective light tubes are positioned at uniform angular intervals around a circle centered on the axis of motor and bell 1. These photoconductors or light tubes transmit light rays, either influenced or emitted by the workpiece 3, to a light detector 11, such as a photocell or photo resistance, and which is mounted on a partition 6a of a housing 6 secured on base plate 7. The output of detector 11 is an electrical signal which is amplified and rectified in a suitable electronic device 9 and indicated by a measuring instrument 10.

As will be explained in somewhat more detail with respect to FIGS. 2a, 2b and 2c, as motor 4 rotates bell 1, the optical systems 2′, 2″ and 2‴ are brought successively into axial alignment with aperture A which is centered over the path of travel of the workpiece 3. As a result, electrical pulses are produced responsive to each interruption of a light beam or each reception of a light beam and these pulses have widths corresponding to the respective diameters or widths of the workpiece 3, as the revolution of the optical systems about an axis which intersects the axis of workpiece 3 perpendicularly results in the optical systems periodically traversing the workpiece in a lateral direction.

Figure 2A:
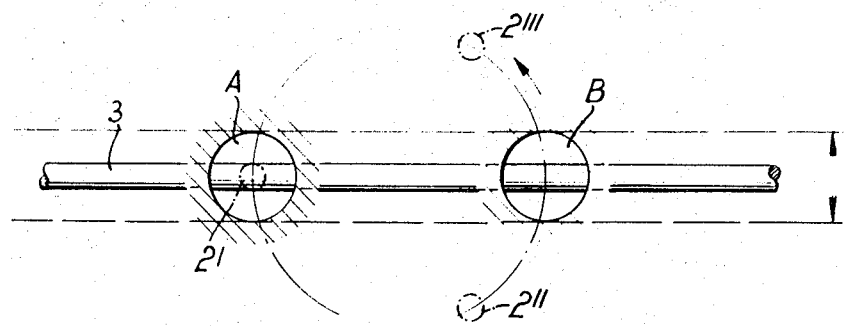
FIG. 2a is a somewhat schematic plan view illustrating a modification of the apparatus shown in FIG. 1.
Figure 2B:
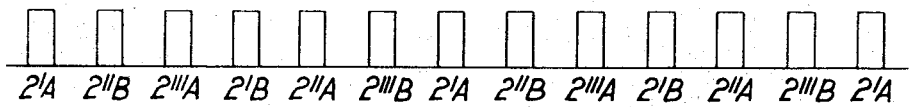
Figure 2C:
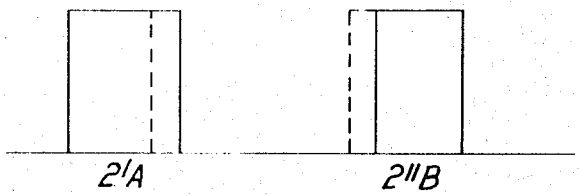

Referring to FIG. 2a, in a modified form of the invention, a second light admitting aperture B may be provided in base plate 7, the apertures A and B being at opposite ends of a diameter of the circle of revolution of the optical systems 2′, 2″ and 2‴, and this diameter is aligned with the center line of the path of movement of the work element or the workpiece 3. With the arrangement of FIG. 2a, the workpiece is scanned more frequently and it is possible to obtain a greater differentiation of the diameters along the workpiece. The particular advantage of the arrangement shown in FIG. 2a is that vibrations of the wire in a plane perpendicular to the axes of the optical systems or to the axis of revolution thereof, with the resultant variations in measurements, can be compensated.

Each time an optical system 2′, 2″ or 2‴ is aligned with a recess A or a recess B, a rectangular pulse is formed when the workpiece 3 is traversed. FIG. 2b illustrates these pulses in chronological order.

If the wire 3 vibrates to either or both sides of its path of movement, as illustrated by the double-headed arrow in FIG. 22a and within the limits indicated by the broken lines of FIG. 2a, the widths of the pulses are varied. If the particular optical system′ and the wire are moving in the same lateral direction, the pulse width is increased but, if the wire and the particular optical system are moving in opposite direction, the pulse width is decreased. If the wire vibrates in such a manner that, for example, its movement relative to aperture A coincides with the scanning direction, the width of pulse 2′A is increased. During the passage of optical system 2′ across aperture B, the wire will still have the same direction of motion so that the pulse 2″B is decreased in width. This is shown in FIG. 2c, wherein the differences can be noted directly from the dotted lines. The mean value of both pulses, which is derived in the detector 11, contains either no error or a very much reduced error due to wire vibrations.

Figure 3A:
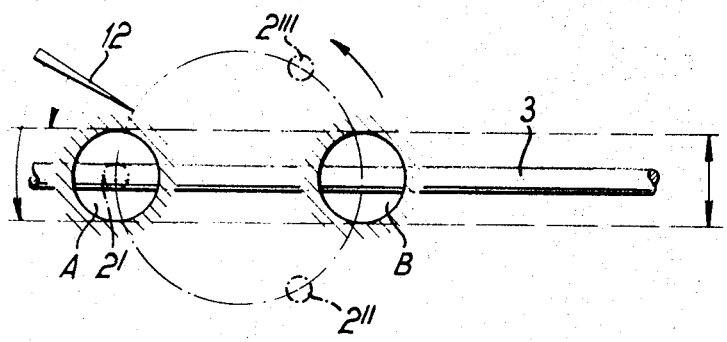
FIG. 3a is a view, similar to FIG. 2a, of a further modified form of the invention.
Figure 3B:
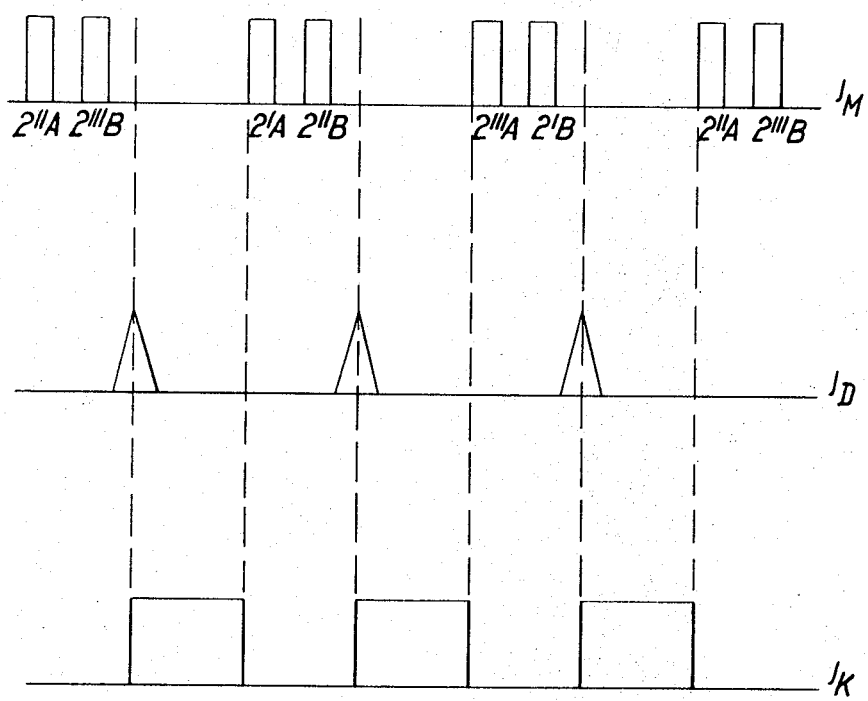

FIGS. 3a and 3b illustrate a further embodiment of the invention in which measuring errors caused by displacement of the workpiece are substantially completely eliminated. For this purpose, an additional trigger device, as represented schematically in FIG. 3a, is arranged at the point 12. The trigger arrangement at the point 12 may comprise, for example, a small magnet on the head plate 1a of bell 1 and an inductive receiver in the partition 6a of housing 6, and positioned immediately above end or head plate 1a. Whenever the magnet passes the inductive receiver, the latter emits a voltage signal which can have the form of a triangular pulse. These triangular pulses are indicated in the line $J_D$ of FIG. 3b, and each triangular pulse opens a gate which is closed again by the front flank of a measuring pulse as shown in line $J_M$ of FIG. 3b. As a result, a sequence of correcting pulses, as shown in line $J_K$ of FIG. 3b, is formed.

The time between the opening and closing of the gate, which corresponds to the length of the correcting pulses, also corresponds to the distance between a longitudinal edge of the work element and the trigger point 12. This time, with the wire diameter known, thus indicates the changed position of the work element with respect to trigger point 12. If the correcting pulses of line $J_K$ of FIG. 3b are integrated, there is obtained a D.C. voltage signal which is proportional to the distance between trigger point 12 and the nearer longitudinal edge of the work element. This D.C. voltage may be applied to a relatively small electronic unit in which it is transformed into a correction quantity which is added to or subtracted from the final measuring D.C. voltage obtained and in accordance on the position of the wire.

It should be appreciated that while an inductive trigger has been mentioned by way of example, other electronic-optical or mechanical triggers can also be used.

While specific embodiments of the invention have been shown and described in detail to illustrate the application of the principles of the invention, it will be understood that the invention may be embodied otherwise without departing from such principles.

What is claimed is:

1. Apparatus for measuring the lateral dimensions of relatively narrow workpieces moving longitudinally of themselves by influencing a light beam incident upon an electro-optical device to provide electrical pulses having pulse widths proportional to respective lateral dimensions along the workpieces, said apparatus comprising, in combination, at least one optical system including at least two light transmitting elements spaced coaxially along an optical axis which is perpendicular to the path of movement of the workpieces and also including an electro-optical device, with the width of the light transmitting aperture of at least one element being small relative to the dimension to be measured; a plate formed with two fixed light transmitting apertures centered on the longitudinal center line of the path of movement of the workpieces and spaced longitudinally of such center line; mounting means supporting each optical system for revolution about an axis of revolution perpendicular to and bisecting the longitudinal center line of the path of movement of the workpieces and parallel to the optical axis of the optical system, with the radius of revolution being equal to one half the center-to-center spacing of said fixed apertures; and means operable to rotate said mounting means to bring each optical system successively and repetitively into alignment with each of said fixed apertures.

2. Apparatus, as claimed in claim 1 in which said mounting means comprises a bell having a cylindrical wall and rotatable about its axis; plural optical systems mounted on said bell adjacent its cylindrical wall and at uniform angular intervals around said cylindrical wall; said plate having said fixed apertures being a stationary circular base plate positioned beneath said bell.

3. In a method of measuring the lateral dimensions of relatively narrow workpieces moving longitudinally of themselves by influencing a light beam incident upon an electro-optical device to provide electrical pulses having pulse widths proportional to respective lateral dimensions along the workpieces, the improvement comprising: providing at least one optical system including at least two light transmitting elements spaced coaxially along an optical axis which is perpendicular to the path of movement of the workpieces and also including an electro-optical device, with the width of the light transmitting aperture of at least one element being small relative to the dimension to be measured; providing two fixed light transmitting apertures centered on the longitudinal center line of the path of movement of the workpieces and spaced longitudinally of such center line; and revolving each optical system about an axis of revolution perpendicular to and bisecting such center line and parallel to the optical axis of the optical system, with the radius of revolution being equal to one half the center-to-center spacing of the fixed apertures, to bring each optical system successively and repetitively into alignment with each of the respective fixed apertures.

4. In a method of measuring lateral dimensions, the improvement claimed in claim 3, in which the workpiece is the source of the light beam.

5. In a method of measuring lateral dimensions, the improvement claimed in claim 3, in which the workpiece interrupts light entering the optical system as the optical system axis intersects the workpiece.

6. In a method of measuring lateral dimensions, the improvement claimed in claim 3, including the step of directing the light beam, entering an optical system, initially through a lens and then through an apertured diaphragm having an aperture coaxial with the optical axis of the lens, so as to reproduce sharply a small area in the plane of movement of the workpiece in the aperture of the diaphragm.

References Cited

UNITED STATES PATENTS

| | | | |
|---|---|---|---|
| 2,792,504 | 5/1957 | Slamar et al. | 250—219 |
| 2,919,624 | 1/1960 | Lindermann et al. | 250—236 X |
| 2,999,590 | 9/1961 | Gerhardt | 209—82 |
| 3,052,800 | 9/1962 | Miller | 250—236 X |
| 3,112,422 | 11/1963 | Schneider | 250—202 X |
| 3,131,306 | 4/1964 | Weiss | 250—219 X |
| 3,226,532 | 12/1965 | Gordon et al. | 250—236 X |
| 3,313,942 | 4/1967 | Lange | 250—219 |
| 3,395,282 | 7/1968 | Blackwell | 250—202 |

OTHER REFERENCES

German Auslegeschrift No. 1,145,388, Phywe Aktiengesellschaft, Mar. 14, 1963.

WALTER STOLWEIN, Primary Examiner

T. N. GRIGSBY, Assistant Examiner

U.S. Cl. X.R.

250—236; 356—160